INVENTOR.
ROBERT W. PFAFF
BY
Woodling and Krost,
Attys.

INVENTOR.
ROBERT W. PFAFF
BY
Woodling and Krost,
attys.

Sept 3, 1957 R. W. PFAFF 2,805,386

PHASE SHIFTING CIRCUIT

Filed Dec. 11, 1953 4 Sheets-Sheet 3

INVENTOR.
ROBERT W. PFAFF
BY
Woodling and Krost,
Attys.

INVENTOR.
ROBERT W. PFAFF
BY
Woodling and Krost,
Attys.

United States Patent Office 2,805,386

Patented Sept. 3, 1957

2,805,386

PHASE SHIFTING CIRCUIT

Robert W. Pfaff, Cleveland, Ohio, assignor to The Reliance Electric & Engineering Company, a corporation of Ohio Application December 11, 1953, Serial No. 397,694

16 Claims. (Cl. 323—124)

The invention relates in general to electrical phase shifting circuits and more particularly to phase shift circuits for controlling a load wherein the phase shift circuit includes an inductive reactance inductively coupled to a winding with means for connecting to the output terminals of the phase shifting circuit.

An object of the invention is to provide a phase shifting circuit wherein the output voltage may be shifted in excess of one hundred eighty degrees.

Another object of the invention is to provide a phase shifting circuit wherein the output voltage may remain substantially constant when desired.

Another object of the invention is to provide a phase shifting circuit including an inductive reactance inductively coupled to an inductive winding so that a change of phase and magnitude of the voltage on the inductive reactance is imparted to the voltage across the inductive winding.

Another object of the invention is to provide a phase shift circuit which includes a first series resonant circuit and a second circuit inductively coupled thereto so that a change in the phase and magnitude of the voltage in the series resonant circuit causes a similar change in the phase of the voltage in the second circuit.

Another object of the invention is to provide a phase shifter which includes a saturable reactor having an additional winding which is inductively coupled to the normal alternating current winding on the reactor so that the direct current or control winding on the reactor controls the phase of the voltage on both alternating current windings of the reactor.

Another object of the invention is to provide a phase shifter including an inductive winding coupled to an inductive impedance wherein the voltage vector of the inductive winding is always parallel to and proportional to the magnitude of the voltage across the pure inductive component of the inductive impedance as the phase of the voltage thereof is varied.

Other objects and a fuller understanding of this invention may be had by referring to the following description and claims, taken in conjunction with the accompanying drawings, in which:

Figure 15:
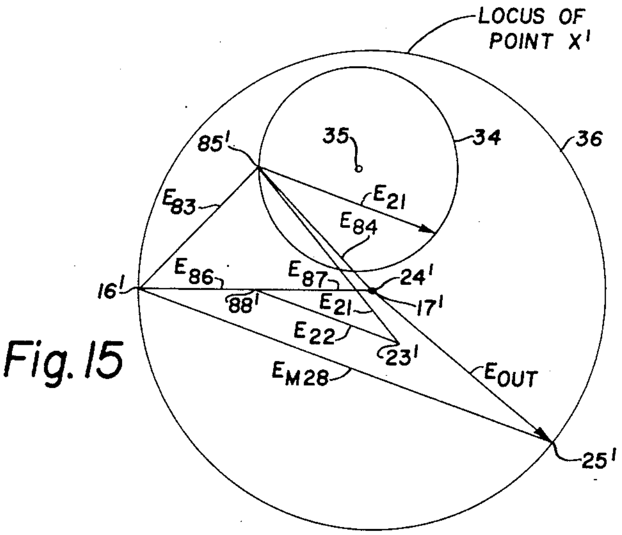
Figure 16:
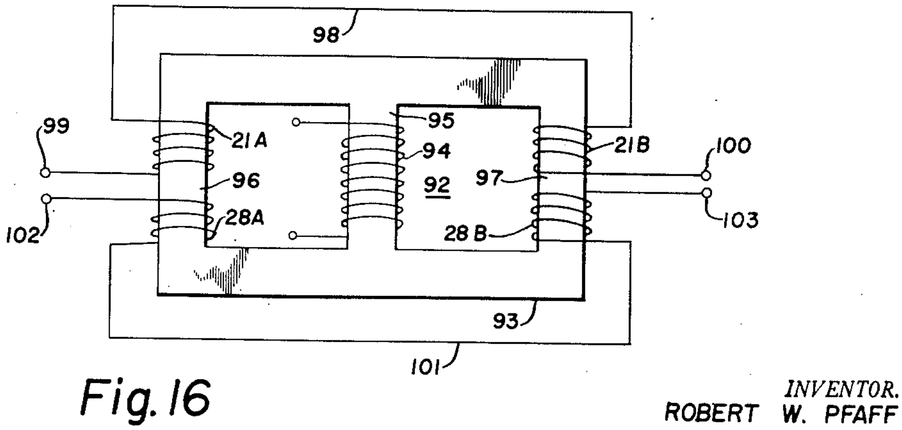

Figures 4, 6, 8, 10, 12, and 14 show schematically different forms of phase shifting circuits;

Figures 5, 7, 9, 11, 13, and 15 show voltage vector diagrams of the voltages obtainable from the various circuits; and Figure 16 is a plan view of a saturable reactor which may be used in the various circuits.

Figure 1:
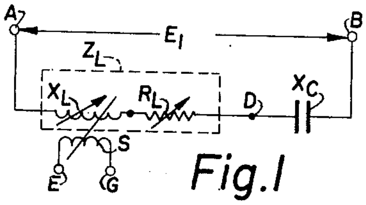
Figure 1 is a schematic diagram of a basic circuit used for explanatory purposes.

The circuit of Figure 1 is a simple circuit used to explain the principle of operation of the invention. An alternating voltage $E_1$ is impressed across a series circuit composed of the variable inductive impedance $Z_L$ and the capacitive reactance $X_C$ as shown in Figure 1. Figure 1 shows $Z_L$ separated into its components of a pure inductive reactance $X_L$ and a pure resistance $R_L$. An additional element, shown in Figure 1 as a coil S, is inductively coupled to $X_L$. $Z_L$ is varied in such a manner as to vary $X_L$ and $R_L$ simultaneously and the quality factor, $Q=X_L/R_L$ is maintained reasonably constant.

The equation relating the voltage developed across $X_L$ to the impressed voltage $E_1$ is:

$$E_{X_L}=E_1\frac{jX_L}{jX_L+R_L-jX_C} \qquad (1)$$

But $$R_L=\frac{X_L}{Q}$$

Therefore:

$$E_{X_L}=E_1\frac{jX_L}{jX_L+X_L/Q-jX_C}=E_1\frac{1}{(1-j1/Q)-X_C/X_L} \qquad (2)$$

The only variable in Equation 2 is the inductive reactance $X_L$, since $X_C$ and Q have been assumed to be constant. It may also be noted that $X_L$ occurs only in the ratio $X_C/X_L$.

Figure 2:
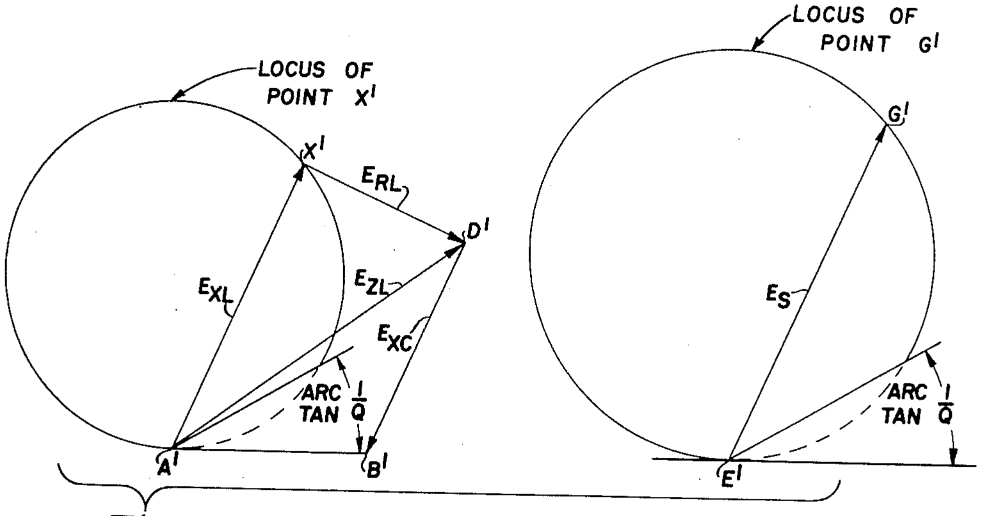
Figure 2 is a voltage vector diagram of the voltages obtainable in the circuit of Figure 1.

When this Equation 2 is plotted vectorially for all possible values of $X_L$ (or, more explicitly, all possible values of the ratio $X_C/X_L$) the result is a circle passing through the origin of the coordinate system, with its center directly above the origin, and with a diameter equal to $QE_1$. This is shown in Figure 2, together with representative vectors showing voltages across $R_L$, $Z_L$, and $X_C$ for one particular condition.

Since negative values of inductance are not realizable, the portion of this locus which is physically obtainable is limited to that part shown as solid. Negative inductances would be required to obtain that part of the locus which is shown dotted. The dotted portion of the locus may be shown mathematically to be that part below a chord of the circular locus, which chord makes an angle relative to the baseline A′—B′ equal to the arctan $1/Q$.

The solid portion of the locus thus shows that more than 270° rotation of the vector $E_{XL}$ is physically obtainable by relatively varying $X_L$ and $X_C$. Also, when the point X′ is at the twelve o'clock position on the circular locus, the vector $E_{RL}$ will be horizontal, that is, parallel to the base line A′—B′, so that under this condition, which is readily obtainable, there will be unity power factor in the circuit means or branch circuit which includes the variable inductive impedance $Z_L$ and capacitive reactance $X_C$. In each of the circuits which follow, unity power factor in this branch circuit is also easily obtainable.

The voltage developed across the terminals of element S due to inductive coupling with $X_L$ will be in phase with $E_{X_L}$. The magnitude of this voltage will be determined by the degree of coupling between S and $X_L$. It may be larger, equal to, or smaller than $E_{X_L}$ as may be found most convenient for its ultimate utilization. In any case, the ratio of voltages $E_S/E_{X_L}$ across S and $X_L$ for a given arrangement will be constant as $X_L$ is varied.

Since the voltages appearing across S and $X_L$ are always in phase and have a fixed magnitude ratio, the locus of voltage across S will also be a circle as $X_L$ (and $R_L$) is varied. This is shown in Figure 2. The ratio of diameters of the two circular loci is the same as the ratio of voltages $E_S/E_{X_L}$ across S and $X_L$.

Since there is no conductive connection between element S and the rest of the circuit, element S can be connected as desired into the circuit or into associated circuits. By this means, a large number of phase shifting circuits may be devised, it being necessary only to position the circular locus by suitably connecting one terminal of element S such that the circular locus of voltage across element S is suitably located on the vector diagram, and then locate another terminal of the network such that its position on the vector diagram is in the center of the locus. The voltage between this terminal and the remaining terminal of element S will then be of variable phase and approximately constant amplitude as $Z_L$ is varied.

Figure 3:
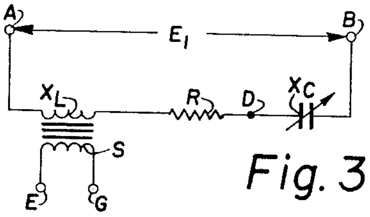
Figure 3 is an alternative schematic diagram of a basic circuit.

An alternative arrangement is to vary only the capacitive reactance $X_C$. The alternating voltage $E_1$ is impressed across a series circuit comprising inductive reactance $X_L$, resistance R, and variable capacitive reactance $X_C$ as shown in Figure 3. It is understood that some or all of the resistance R may physically be included in the circuit devices which also comprise $X_L$ or $X_C$, but that it remains relatively constant as $X_C$ is varied. An additional element, shown in Figure 3 as a coil S, is coupled through mutual induction to $X_L$. Since both $X_L$ and R are constants, the quality factor, $Q=X_L/R$, is constant as $X_C$ is varied.

The equation relating voltage developed across $X_L$ to the impressed voltage $E_1$ is:

$$E_{X_L}=E_1\frac{jX_L}{jX_L+R-jX_C} \qquad (3)$$

But $$R=\frac{X_L}{Q}$$

Therefore:

$$E_{X_L}=E_1\frac{jX_L}{jX_L+R-jX_C}=E_1\frac{1}{(1-j1/Q)-X_C/X_L} \qquad (4)$$

Equation 4 is seen to be identically the same as Equation 2. Therefore, when Equation 4 is plotted vectorially for all possible values of the ratio $X_C/X_L$, the result will be that shown in Figure 2, and the descriptions of the Figure 2 previously given still apply. Also, the descriptions, previously given, of the voltages appearing across the terminals of element S still apply. The method, previously described, of devising circuits utilizing the voltage developed across the terminals of element S is also valid.

Examination of Equation 2 or 4 shows that the only variable is the ratio $X_C/X_L$, provided the quality factor Q is maintained constant. The ratio $X_C/X_L$ may be varied by varying $X_C$ or $X_L$ or by varying them simultaneously. The remarks, previously made, concerning voltages appearing in the circuit and the method of devising circuits utilizing the voltage developed across the terminals of element S also hold for the case where $X_L$ and $X_C$ are varied simultaneously.

Figures 4, 5:
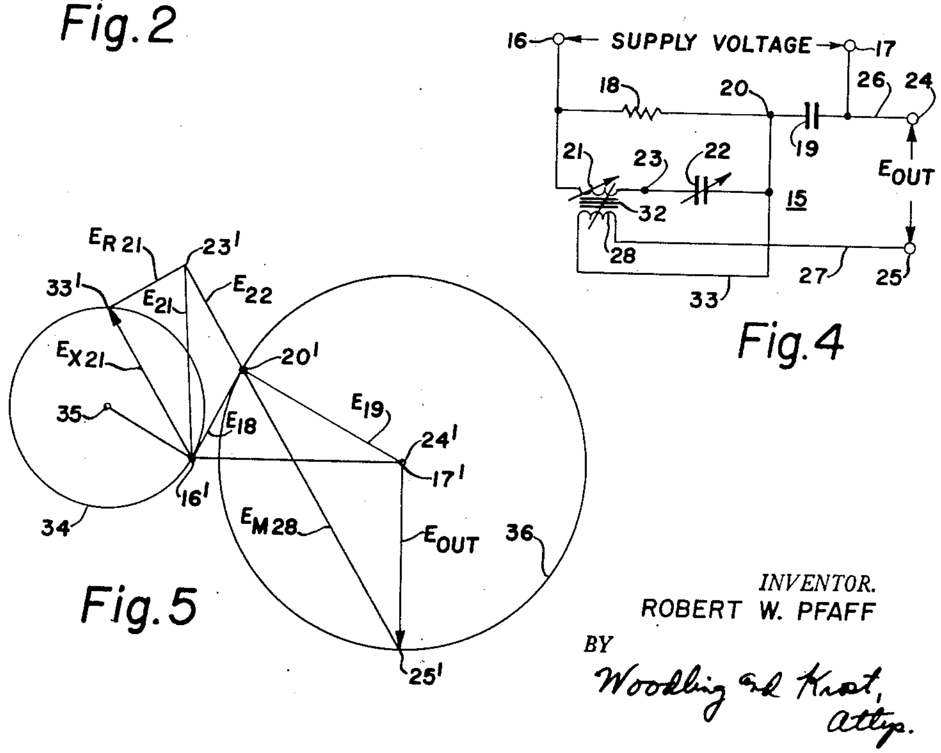

Figure 4 shows a schematic diagram of a phase shifting circuit 15 which is preferred for its simplicity. This circuit has input terminals 16 and 17 which may be connected to an alternating current source or other periodic voltage source. A ressitance 18 and a condenser 19 are connected in series across the input terminals with a terminal 20 connected therebetween. An inductive reactance 21 and a capacitive reactance 22 are connected in series across the resistance 18 with a junction 23 therebetween. The term inductive reactance is used, even though it is realized that in the usual case this reactance will include a resistive component. The input terminal 17 also is connected to an output terminal 24 by a lead 26. A second output terminal 25 is connected by a lead 27 to an inductive winding 28. The winding 28 is inductively coupled to the inductive reactance 21. This may be similar to transformer coupling as effected by the iron core 32. The other end of the winding 28 is connected by a lead 33 to the terminal 20. The reactances 21 and 22 are shown as being variable, and it will be understood that either or both may be variable as long as the relative impedance of the two may be varied.

The Figure 5 is a voltage vector diagram of voltages obtainable from the phase shifting circuit 15 of Figure 1. The potentials on the voltage vector diagram of Figure 5 are indicated by the reference number of the terminal or junction followed by a prime ('), and voltages on this diagram are indicated by the letter E followed by a subscript the same as the reference number of the circuit element. Thus, on the diagram of Figure 5 the potential at the terminals 16 and 17 is indicated by the reference numbers 16' and 17'. The voltage between points 16' and 20' is a baseline voltage across which the serially connected inductive and capacitive reactances 21 and 22 are connected. The potential at the junction 23 is indicated by the reference number 23'.

In many cases it is desired to maintain a substantially constant output voltage as the phase thereof is shifted, and this may be effected by maintaining the Q of the inductive and capacitive reactances constant as the relative impedance thereof is varied. Assuming the capacitive reactance 22 to be a pure reactance without a resistive component and assuming the inductive reactance 21 to have both an inductive and a resistive component, as would closely approximate actual conditions, the voltage across the inductive component of the inductive reactance 21 may be plotted on the Figure 5 as the vector $E_{X21}$. It does not matter how the resistance is distributed so long as the ratio $L/R$ is a constant. The resistive component of the reactance 21 would thus be shown by the voltage vector $E_{R21}$. A theoretical point 33' may thus be located on the diagram of Figure 5 at the junction of the components $E_{X21}$ and $E_{R21}$. It will be noted that the vector $E_{X21}$ is parallel to the vector $E_{22}$, the voltage across the reactance 22, but does not have the same relative magnitude as the phase is shifted. The point 33' will describe a circular locus 34 about a center 35 which is on a perpendicular to the vector 16'—20' extending through the point 16'. This may be shown by referring to the foregoing principle of operation. The voltage vector $E_{M28}$ depicts the voltage obtained across the inductive winding 28. The phase of the vector $E_{M28}$ will always be parallel to the vector $E_{X21}$, and the magnitude will always be proportional to the magnitude of vector $E_{X21}$. The actual magnitude for any given phase angle will be determined by the turns ratio between the inductive reactance 21 and the inductive winding 28. Therefore, as the vector $E_{X21}$ describes the circular locus 34, the vector $E_{M28}$ will describe a circular locus 36 on and tangent to the baseline $E_{18}$. The values of the components may be chosen such that the output terminal 24 is established at the center of the locus 36. The output voltage vector $E_{out}$ will thus remain constant with a phase change well in excess of one hundred eighty degrees.

Figure 6:
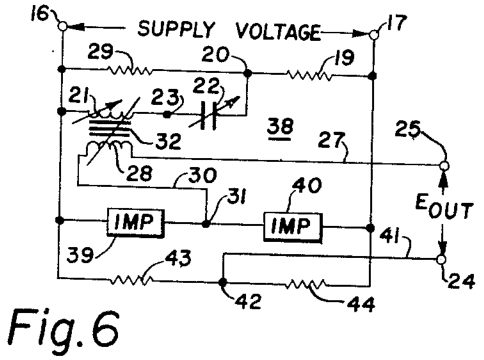

The Figure 6 shows a modified form of phase shifting circuit 38 again having input terminals 16 and 17 and output terminals 24 and 25. The terminal 20 is at the junction of resistances 19 and 29, and again the inductive reactance 21 and capacitive reactance 22 are connected in series across the terminals 16 and 20. The inductive winding 28 is again connected to the output terminal 25 by the lead 27. The other end of the winding 28 is connected by a lead 30 to a terminal 31 which is at the junction of first and second serially connected impedances 39 and 40. These impedances are connected in series and connected across the input terminals 16 and 17. In this Figure 6 the output terminal 24 is connected by a lead 41 to a terminal 42 connected at the junction of resistances 43 and 44 which are connected in series across the input terminals 16 and 17.

The Figure 7 again gives the voltage vectors on a vector diagram obtainable from the circuit of Figure 6. The vector $E_{22}$ will be parallel to the vector $E_{X21}$, but these vectors will not have a constant relative magnitude as the phase thereof is shifted. As shown in this Figure 7, the vector $E_{X21}$ is greater than the vector $E_{22}$; however, when the vectors are shifted in phase by ninety degrees lead, for example, the vector $E_{22}$ will be greater than the vector $E_{X21}$. Also, on this vector diagram of Figure 7 the vector $E_{M28}$ is always parallel to the vector $E_{X21}$. The junction between the vectors $E_{X21}$ and $E_{R21}$ is again shown as the point 33′, and this point again defines a circular locus 34. The vector $E_{M28}$ as it rotates in phase will establish the locus 36 as defined by the potential at the output terminal 25.

Figure 8:
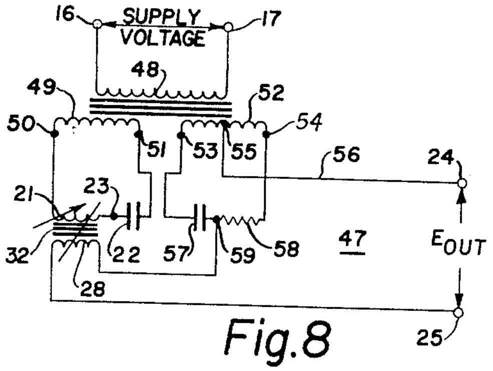
Figures 7, 9:
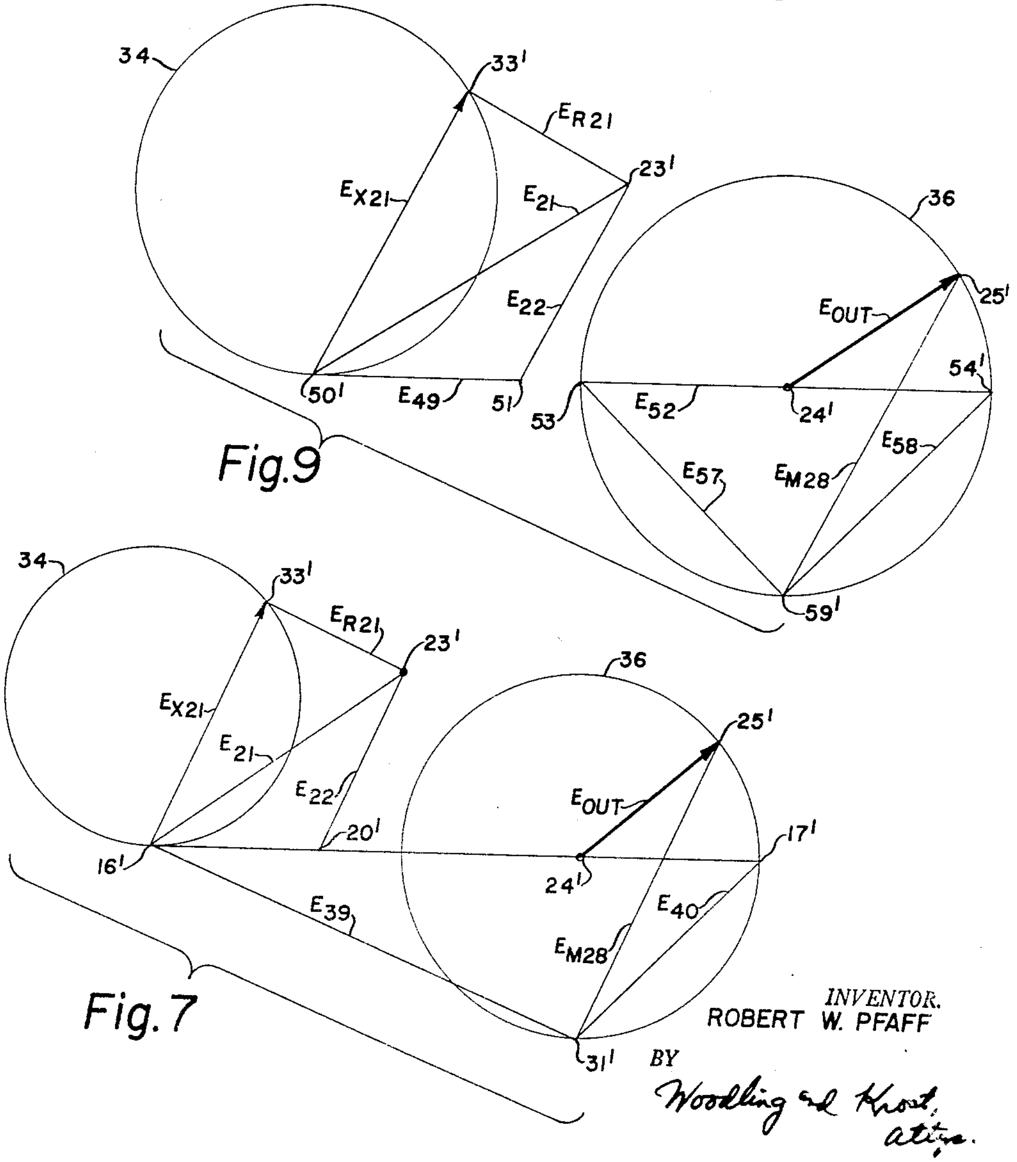

The Figure 8 shows still another phase shifting circuit 47 with the voltages thereof shown on the vector diagram of Figure 9. In Figure 8 the input terminals 16 and 17 which are energized from an alternating current source are connected to a transformer primary 48. A secondary 49 of this transformer has terminals 50 and 51. The inductive reactance 21 and capacitive reactance 22 are serially connected across the terminals 50 and 51. Another secondary 52 of the supply transformer has terminals 53 and 54 and a center tap 55. This center tap 55 is connected by a lead 56 to the output terminal 24. Across the terminals 53 and 54, a condenser 57, and a resistance 58 are serially connected with a terminal 59 therebetween. The winding 28 is connected to the terminal 59 and the output terminal 25.

The Figure 9 shows that the voltage vector $E_{49}$ is parallel to the voltage vector $E_{52}$ but has been physically displaced therefrom for clarity. Again the point 33′ describes the circular locus 34, and the vector $E_{M28}$ describes the circular locus 36. The circuit of Figure 8 shows that it is not essential that the output terminals 24 and 25 be conductively coupled to the circuit containing the inductive reactance 21 and capacitive reactance 22.

Figures 10, 11, 12, 13:
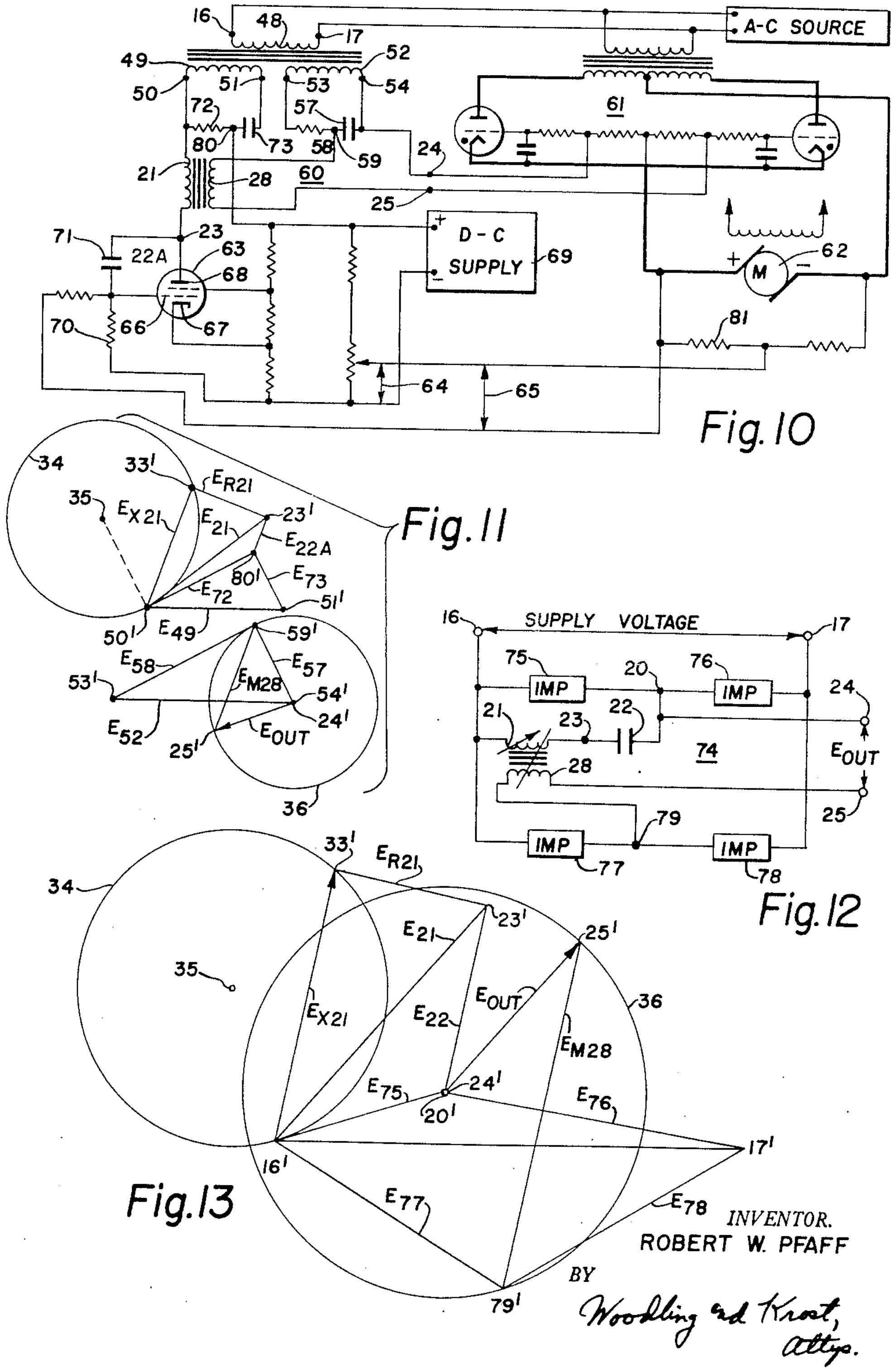

The Figure 10 shows a phase shifting circuit 60 controlling a controllable rectifier 61 which energizes a motor armature 62. This illustrates one form of complete circuit which may be controlled by the phase shifter 60. The phase shifting circuit 60 is somewhat similar to the circuit of Figure 8 but wherein the capacitive reactance 22A has been shown as a reactance tube 63 and associated circuits. The reactance tube 63 may have a signal voltage 64 and an armature feedback voltage 65 combined to control the bias between a grid 66 and cathode 67 on the tube 63. The tube 63 may obtain operating voltages for the plate 68 from an operating voltage source 69. A resistor 70 between the grid 66 and the cathode 67 and a condenser 71 between the grid 66 and plate 68 establishes the phase of the grid-cathode voltage, and hence, the anode-cathode current, ninety degrees leading of the anode-cathode voltage. Thus, the tube 63 exhibits the properties of a capacitive reactance. A resistance 72 and a condenser 73 with a terminal 80 therebetween are connected in series across the secondary 49. The capacitive reactance 22A may be connected between the terminals 23 and 80 and thus the phase shifting circuit 60 will perform in essentially the same manner as the phase shifting circuit 47. The output of the phase shifting circuit 60 appears at the output terminals 24 and 25 and controls in a generally conventional manner the controllable rectifier 61. This rectifier may be connected to the same alternating current source as that which energizes the transformer primary 48. The rectifier 61 supplies rectified energy to the motor armature 62, and across this armature is connected an impedance 81 to develop the feedback voltage 65.

The Figure 11 is a voltage vector diagram of the voltages obtained in the circuit of Figure 10. It will be noted that this vector diagram of Figure 11 is similar to the vector diagram of Figure 9 in that the two reference voltages of the transformer secondaries are separated. It will be further noted that the vector diagram of Figure 11 is similar to the vector diagram of Figure 5 with the exception that there are two separate RC triangles rather than only one. In this circuit of Figure 10 it will be noted that the reactance 22A is that which is variable rather than the inductance 21. The vector diagram of Figure 11 shows the vectors $E_{X21}$ and $E_{M28}$ rotated to their most clockwise position. The output vector $E_{out}$ is thus rotated to a position of about one hundred sixty degrees lagging at which position the controllable rectifier 61 will have a minimum output.

The Figure 12 shows a phase shifting circuit 74. In this circuit impedances 75 and 76 establish a terminal 20 therebetween, and impedances 77 and 78 establish the terminal 79 therebetween. The inductive winding 28 is connected between the terminals 25 and 79.

The Figure 13 shows the voltage vectors obtainable from the circuit of Figure 12 with the terminal 20 having a point of reference potential above the baseline 16′—17′, and the terminal 79 having a point of reference potential below the baseline 16′—17′. The values of the impedances 75 and 76 and their reactive components have been chosen to thus tilt the baseline 16′—20′ and to establish the point 20′ at a convenient position for the center of the circular locus 36. Also, the values and reactive components of the impedances 77 and 78 have been chosen to move the point 79′ below the input voltage 16′—17′ in order to establish the circular locus 36 about the point 20′ as the center. In this case the output terminal 24 is electrically the same as the terminal 20, and the center 35 of the locus 34 lies on a perpendicular to the baseline voltage $E_{75}$ passing through the point 16′.

Figure 14:
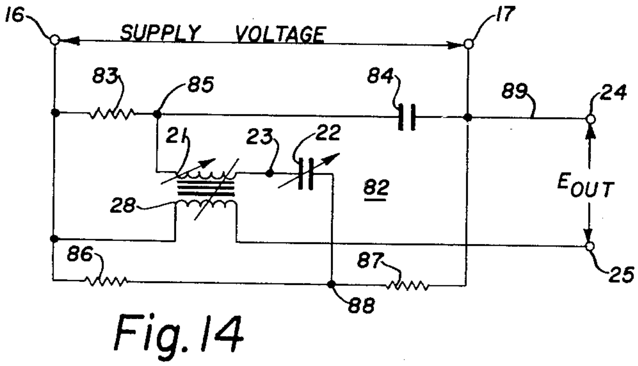

The Figure 14 shows still another phase shifting circuit 82, which has a resistance 83 and a condenser 84 connected in series with a terminal 85 therebetween and connected across the input terminals 16 and 17. Resistances 86 and 87 connected across the input terminals 16 and 17 have a terminal 88 therebetween. The inductive reactance 21 and capacitive reactance 22 are connected across the terminals 85 and 88. The inductive winding 28 is connected between the terminal 16 and output terminal 25 and the output terminal 24 is connected by a lead 89 to the input terminal 17.

The Figure 15 shows the voltage vector diagram for the circuit 82 and it will be noted that the circuit elements 83, 84, 86, and 87 form a bridge arrangement for establishing the points 85′ and 88′ at right angles to the input voltage 16′—17′. The vector $E_{M28}$ rotates about the point 16′ and the value thereof has been chosen such that the point 17′, which is also the output terminal 24, becomes the center of the circular locus 36.

In the various phase shifting circuits 15, 38, 47, 60, 74, and 82, the inductive reactance 21 has been shown as being inductively coupled to the inductive winding 28. The Figure 16 shows one form of saturable reactor 92 which has the combined function of a variable inductance and an inductive coupling between the inductive reactance 21 and the inductive winding 28. In this Figure 16 a conventional two-window core 93 is shown. A direct current or control winding 94 is wound around a center leg 95. As is more or less conventional construction, the alternating current winding is split into two separate coils 21A and 21B. The coil 21A is wound upon end leg 96 and the coil 21B is wound upon the other end leg 97. The two coils 21A and 21B are connected in series by a lead 98. Alternating current terminals 99 and 100 are provided at the extreme ends of the entire winding 21. The inductive winding 28 comprises two coils 28A and 28B wound upon the legs 96 and 97, respectively. They are connected in series by a lead 101 and have end terminals 102 and 103. Thus, it will be seen that a control voltage, such as a variable direct current voltage, may be applied to the control coil 94 for variable saturation of the iron core 93. The alternating current flux therefore courses around through the outer legs 96 and 97 and hence links together by transformer coupling the windings 21A and 28A and also links together the windings 21B and 28B. Therefore, this saturable reactor with extra alternating current winding provides the combined function of a variable inductive reactance as well as the inductive coupling between two different alternating current windings. Further, the voltage induced into the winding 28 is proportional in magnitude and equal in phase to the voltage of the pure inductive component of the winding 21.

The circuit of Figure 10 shows a variable capacitance 22A rather than a variable inductance 21. If in this circuit of Figure 10 the inductance 21 is made variable by utilizing a saturable reactor, as shown in Figure 16, then this motor control circuit has an added advantage of providing a safety feature. With zero control current on the control winding 94 of the saturable reactor 92, then the saturable reactor exhibits maximum inductive reactance with a minimum voltage across the capacitive reactance 22. This is the condition shown in Figure 11 with the vectors rotated clockwise to a limited initial position. Thus, with zero control current on the saturable reactor 92, the phase of the voltage from the phase shifting circuit 60 is about one hundred sixty degrees lagging the anode voltage on the rectifier 61; and hence, this rectifier 61 has a minimum or negligible output. This safety feature thus assures that should something happen to prevent current flow in the control winding 94, then the rectifier 61 will be phased lagging to stop the motor 62.

The circuits of Figures 6 and 8 show circuit conditions wherein the energizing voltage for the resonating circuit of elements 21 and 22 is in phase with the supply voltage across the input terminals 16 and 17. The circuits of Figures 4, 10, and 12 show circuit conditions wherein the energizing voltage for the resonating circuit 21—22 is displaced from the input supply voltage by somewhat less than ninety degrees. The circuit of Figure 14 shows the circuit conditions which produce the energizing voltage for the resonating circuit 21—22 as being displaced ninety degrees from the input voltage. The circuits of Figures 4, 10, and 14 show circuit conditions wherein it is possible to utilize one of the input terminals also as one of the output terminals. The circuits of Figures 4, 6, 12, and 14 show circuit conditions wherein the output voltage is conductively connected to the resonating circuit 21—22 whereas the circuits of Figures 8 and 10 show inductive coupling only rather than conductive coupling. The circuits of Figures 4, 6, 8, 10, and 14 show circuit conditions wherein the base of the circular locus 36 has been displaced so that the center 24 of this circle lies on the supply line voltage 16—17. It will also be noted that the base of the circular locus 36 can be on the supply line voltage 16—17 and the other output terminal 24 be displaced to the center of the circle, similar to the Figure 13, wherein both the base of the circular locus 36 and the center 24′ of this locus have been displaced from the supply line voltage vector 16′—17′.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A phase shift circuit, comprising output terminals and input terminals energizable from a periodic voltage source, reactive means, means to connect said reactive means to said voltage source and to one of said output terminals, resonatable circuit means reactively coupled to said reactive means, means to energize said resonatable circuit means from said periodic voltage source, means interconnecting the other of said output terminals and said periodic voltage source, and means to vary the phase of the voltage in said resonatable circuit means to thereby vary the phase of the voltage across said reactive means and thereby vary the phase of the voltage between said output terminals.

2. A phase shift circuit, comprising output terminals and input terminals energizable from a periodic voltage source, inductive means, means to connect said inductive means to said voltage source and to one of said output terminals, resonatable circuit means inductively coupled to said inductive means, means to energize said resonatable circuit means from said periodic voltage source, means interconnecting the other of said output terminals and said periodic voltage source, and means to vary the phase of the voltage in said resonatable circuit means to thereby vary the phase of the voltage across said inductive means and thereby vary the phase of the voltage between said output terminals.

3. A phase shift circuit, comprising output terminals and input terminals energizable from a periodic voltage source, inductive means, means to connect said inductive means to said voltage source and to one of said output terminals, means interconnecting the other of said output terminals and said periodic voltage source to establish a point of reference potential, resonatable circuit means inductively coupled to said inductive means, means to energize said resonatable circuit means from said periodic voltage source, and means to vary the phase of the voltage in said resonatable circuit means to thereby vary the phase of the voltage across said inductive means throughout a locus having said point of reference potential within said locus.

4. A phase shift circuit, comprising output terminals and input terminals energizable from a periodic voltage source, inductive means, first means to connect said inductive means to said voltage source and to one of said output terminals, second means interconnecting the other of said output terminals and said periodic voltage source to establish a point of reference potential, resonatable circuit means inductively coupled to said inductive means, means to energize said resonatable circuit means from said periodic voltage source, and means to vary the phase of the voltage in said resonatable circuit means to thereby vary the phase of the voltage across said inductive means throughout a locus having said point of reference potential generally at the center thereof.

5. A phase shift circuit, comprising pairs of input and output terminals, means for energizing said input terminals from an alternating current source, an inductive winding connected to one of said output terminals and connected to said alternating current source, first circuit means interconnecting the other of said output terminals and said alternating current source to establish a point of reference potential, second circuit means including an inductive and a capacitive reactance serially connected with said inductive reactance inductively coupled to said inductive winding, means to energize said second circuit means from said alternating current source, and means to vary the relative impedance of said reactances to thereby vary the phase of the voltage across said inductive winding throughout a locus having said point of reference potential generally at the center thereof.

6. A phase shift circuit, comprising pairs of input and output terminals, means for energizing said input terminals from an alternating current source, means including an inductive winding interconnected between one of said output terminals and one of said input terminals, circuit means interconnecting the other of said output terminals and said alternating current source to establish a point of reference potential, series resonant circuit means inductively coupled to said inductive winding and including an inductive and a capacitive reactance serially connected, means to energize said series resonant circuit means from said alternating current source, and means to vary the relative impedance of said reactances to thereby vary the phase of the voltage across said inductive winding throughout a locus having said point of reference potential generally at the center thereof.

7. A phase shift circuit comprising impedance means, means for energizing said impedance means from a periodic voltage source, an inductive reactance and a capacitive reactance connected effectively in series and to said impedance means, means to vary the relative impedance of said reactances, inductive means coupled to said inductive reactance to have a phase shiftable voltage in accordance therewith, first and second output terminals, and means for connecting said inductive means to said voltage source and to at least one of said output terminals.

8. A phase shift circuit comprising impedance means, means for energizing said impedance means from a periodic voltage source, an inductive reactance and a capacitive reactance connected effectively in series and to said impedance means, means to vary the relative impedance of said reactances, inductive means coupled to said inductive reactance to have a phase shiftable voltage in accordance therewith, means for connecting a third terminal to said periodic voltage source, second impedance means connected to said voltage source for establishing a first output terminal having a first point of reference potential, a second output terminal, and means for connecting said inductive means between said third terminal and said second output terminal whereby the voltage at the second output terminal describes a generally arcuate locus of more than one hundred eighty degrees having said first point of reference potential of said first output terminal within said locus.

9. A phase shift circuit comprising, impedance means, means for connecting said impedance means to an alternating current source, an inductive reactance and a capacitive reactance connected in series across said impedance means, means to vary the relative impedance of said reactances, an inductive winding inductively coupled to said inductive reactance to have a phase shiftable voltage in accordance therewith, means for connecting a third terminal to said alternating current source, second impedance means connected to said source for establishing a first output terminal having a first point of reference potential, a second output terminal, and means for connecting said inductive winding between said third terminal and said second output terminal whereby the voltage at the second output terminal describes a generally arcuate locus of more than one hundred eighty degrees having said first point of reference potential of said first output terminal within said locus.

10. A phase shift circuit comprising impedance means, means for connecting said impedance means to an alternating current source, an inductive reactance and a capacitive reactance connected in series across said impedance means, means to vary the relative impedance of said reactances, an inductive winding inductively coupled to said inductive reactance to have a phase shiftable voltage in accordance therewith, means for connecting a third terminal to said alternating current source, second impedance means connected to said source for establishing a first output terminal having a first point of reference potential, a second output terminal, and means for connecting said inductive winding between said third terminal and said second output terminal whereby the voltage at the second output terminal describes a generally arcuate locus having said first point of reference potential of said first output terminal within said locus.

11. A phase shift circuit comprising first and second input terminals, means for connecting said terminals to an alternating current source, impedance means connected to said terminals, an inductive reactance and a capacitive reactance connected in series across said impedance means, means to vary the relative impedance of said reactances to achieve a phase shift of voltages across said inductive reactance, an inductive winding inductively coupled to said inductive reactance to have a phase shiftable voltage in accordance therewith, second impedance means connected to said source for establishing a third terminal having a point of reference potential relative to said alternating current source, third impedance means connected to said source for establishing a first output terminal having a second point of reference potential, a second output terminal, and means for connecting said inductive winding between said third terminal and said second output terminal whereby the voltage at the second output terminal describes a generally arcuate locus of more than one hundred eighty degrees having said second point of reference potential of said first output terminal within said locus.

12. A phase shift circuit comprising first and second input terminals, means for connecting said terminals to an alternating current source, impedance means connected to said terminals, an inductive reactance and a capacitive reactance connected in series across said impedance means, means to vary the relative impedance of said reactances to achieve a phase shift of voltages across said inductive reactance, an inductive winding inductively coupled to said inductive reactance to have a phase shiftable voltage in accordance therewith with the voltage vector thereof generally parallel to the voltage vector of the reactive component of said inductive reactance, second impedance means connected to said source for establishing a third terminal having a point of reference potential relative to said alternating current source, third impedance means connected to said source for establishing a first output terminal having a second point of reference potential, a second output terminal, and means for connecting said inductive winding between said third terminal and said second output terminal whereby the voltage at the second output terminal describes a generally arcuate locus having said second point of reference potential of said first output terminal within said locus.

13. A phase shift circuit comprising first and second input terminals, means for connecting said terminals to an alternating current source, first impedance means, means for connecting said first impedance means to said terminals for establishing a baseline voltage, an inductive reactance and a capacitive reactance connected in series across said first impedance means, means to vary the relative impedance of said reactances to achieve a phase shift of voltage across said inductive reactance, said reactances having a substantially constant Q as they are varied, an inductive winding inductively coupled to said inductive reactance to have a phase shiftable voltage in accordance therewith, second impedance means connected to said source for establishing a third terminal having a point of reference potential relative to said alternating current source, third impedance means connected to said source for establishing a first output terminal having a second point of reference potential, a second output terminal, and means for connecting said inductive winding between said third terminal and said second output terminal whereby the voltage at the second output terminal describes a substantially circular locus having said second point of reference potential of said first output terminal near the center thereof.

14. A phase shift circuit comprising first and second input terminals for connection to an alternating current source, first and second impedance means connected in series to said terminals with a third terminal therebetween and having phase angles generally at quadrature for establishing a baseline voltage at an acute angle to the voltage vector of said alternating current source, an inductive reactance and a capacitive reactance connected in series across said first impedance means, means to vary the relative impedance of said reactances to achieve a phase shift of voltage across said inductive reactance, said inductive reactance having a resistive and a reactive component, said reactances having a substantially constant Q as they are varied such that the junction point between said resistive and reactive components defines a substantially circular locus in a voltage vector diagram with said baseline voltage as a tangent thereto, an inductive winding inductively coupled to said inductive reactance to have a phase shiftable voltage in accordance therewith with the voltage vector thereof generally parallel to the voltage vector of said reactive component, a first output terminal coinciding wtih said second input terminal, a second output terminal, means for connecting said inductive winding between said third terminal and said second output terminal whereby the voltage at the second output terminal describes a substantially circular locus having the potential of said first output terminal near the center thereof.

15. A phase shift circuit, comprising pairs of input and output terminals, means for energizing said input terminals from an alternating current source, an inductive winding, means for connecting said inductive winding to one of said output terminals and to said alternating current source, first means interconnecting the other of said output terminals and said alternating current source to establish a point of reference potential, second circuit means including an inductive and a capacitive reactance serially connected with said inductive reactance inductively coupled to said inductive winding, means to energize said second circuit means from said alternating current source, and means to vary the frequency at which said second circuit means is resonant to vary the phase of the voltage across said inductive winding throughout a curved locus having said point of reference potential within said curved locus.

16. A phase shift circuit, comprising input and output terminals, means for energizing said input terminals from a periodic voltage source, an inductive winding, means for connecting said inductive winding to one of said output terminals and to said source, means interconnecting the other of said output terminals and said source, resonatable circuit means including an inductive reactance inductively coupled to said inductive winding, means to energize said resonatable circuit means from said source, and means to vary the phase of a voltage in said resonatable circuit means to vary the phase of the voltage at the output terminals relative to the input terminals.

References Cited in the file of this patent

UNITED STATES PATENTS

| | | |
|---|---|---|
| 1,077,626 | Mershon | Nov. 4, 1913 |
| 1,948,704 | Fischer | Feb. 27, 1934 |
| 2,125,127 | Roberts | July 26, 1938 |